Dec. 11, 1962

G. U. OPPEL 3,067,606

PHOTOELASTIC DEVICE FOR INDICATING PRINCIPAL STRAIN DIRECTIONS

Filed Dec. 1, 1959

INVENTOR
GEORGE U. OPPEL

Dec. 11, 1962 G. U. OPPEL 3,067,606
PHOTOELASTIC DEVICE FOR INDICATING PRINCIPAL
STRAIN DIRECTIONS
Filed Dec. 1, 1959 2 Sheets-Sheet 2

INVENTOR
GEORGE U. OPPEL
BY

United States Patent Office

3,067,606
Patented Dec. 11, 1962

3,067,606
PHOTOELASTIC DEVICE FOR INDICATING
PRINCIPAL STRAIN DIRECTIONS
George U. Oppel, 1954 Park Forest Ave.,
State College, Pa.
Filed Dec. 1, 1959, Ser. No. 856,594
5 Claims. (Cl. 73—88)

The invention relates to photoelastic strain measuring means of the type for giving a visual indication of the principal strain directions.

It is an object of my invention to provide a gage of this type that can be manufactured relatively inexpensively by utilizing optically homogeneous birefringent material thereby eliminating the need for using optically inhomogeneous birefringent material.

Other objects and advantages will be more apparent to those skilled in the art from the following disclosure and drawings in which.

Figure 2:
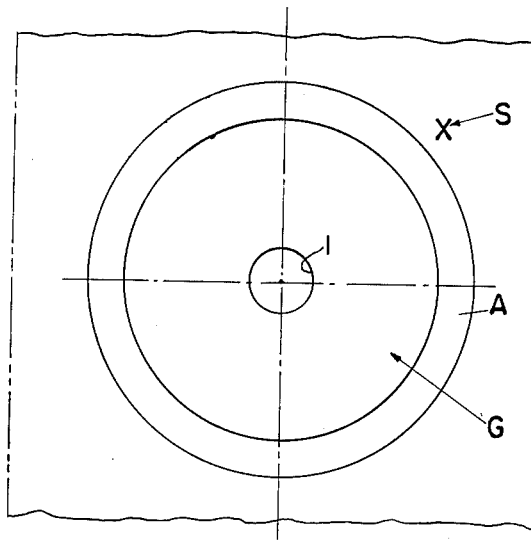
FIG. 2 is a plan view of FIG. 1.
Figure 1:
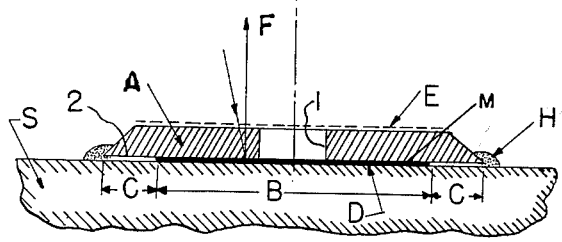
FIG. 1 is a cross sectional view of my improved gage shown mounted on the surface of a test specimen.
Figure 1A:
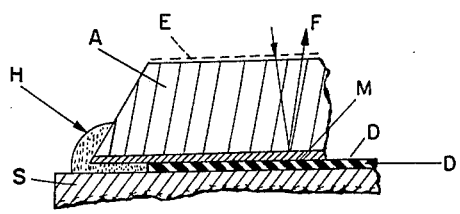
FIG. 1a is a greatly magnified sectional portion of FIG. 1.

As shown in FIGS. 1 and 2 a circular gage plate A of uniform thickness has a circular hole 1 at its center. The gage plate consists of well known optically homogeneous transparent material that is optically strain sensitive or birefrigent such as epoxy resin like "Ara'dite," glass, "Plexiglas," Celluloid, etc. The hole acts as a stress raiser and causes a stress concentration effect in its surroundings. A sheet D of elastic material, such as rubber, preferably not more than 1/100" thick, covers the center part B of the gage plate and prevents the gage plate from being rigidly bonded to the structural part in this region, although the rubber sheet is preferably bonded to the gage plate and may or may not be bonded to the surface of the test specimen. The bonding may take place over the entire areas of both sides of the rubber or only near its edge areas. The purpose of the rubber, whether bonded or not, is to allow free deformation of the gage plate at its hole.

The annular boundary area C of the gage plate serves to receive a bonding cement H such, for example, as, preferably, a cold setting epoxy resin, Bakelite cement, or other well known similar acting cement. The cement can run into the clearance space 2 around the edge of the rubber sheet D as well as over the edge of the gage plate A, but it is desirable not to have such cement run between the rubber sheet and gage plate and thence into the hole 1. This is prevented by the preliminary bonding of the rubber to the gage plate as above mentioned.

A circular polarizing film E (represented by the dashed line) attached to the front face of the gage plate creates a self-contained photoelastic strain gage. A circular polarizing film is the combination of a linear polarizing material wtih a quarter wave plate. The vibration planes of the quarter wave plate are rotated at 45 degrees with respect to the plane of vibration of the linear or plane polarized light. A combination of a Nichol prism and a quarter wave plate would have the same effect on the light F originating from any well known and usual source.

When subjecting this gage to a state of uniaxial stress, fringe patterns of the type shown by FIGS. 3(A) and 4(A) originate. Increasing the tensile stresses maintains the character of the fringe pattern but increases the number of fringe lines.

Subjecting the gage to torsion causes another type of fringe pattern as shown in FIGS. 3(H) and 4(H). The type of fringe pattern displayed by the gage therefore depends upon the ratio of the principal stresses acting in the gage. This effect can easily be explained by a well known calculation of the lines of constant shearing stress which correspond to the lines observed in a photoelastic fringe pattern. The mathematical calculation uses the theoretical solution developed by G. Kirsch and explained by Timoshenko and Goodier in "Theory of Elasticity" in treating the effect of a circular hole on the stress distribution in a plate. This solution can be applied here as an approximation since the gage is free to deform at the hole like a hole in a large plate and since the unbonded region of the gage is large in comparison to the hole. The rubber sheet, whether bonded or not, provides a flexible region because of its softness as compared to the gage plate and specimen materials. The purpose of the flexible region is to allow stress concentration at the boundary of hole 1 to be fully realized, which would not be the case if this region of the gage plate were rigidly connected to the specimen. The free deformation of the gage plate at this flexible region allows the typical stress and interference patterns to be formed.

Figure 3:
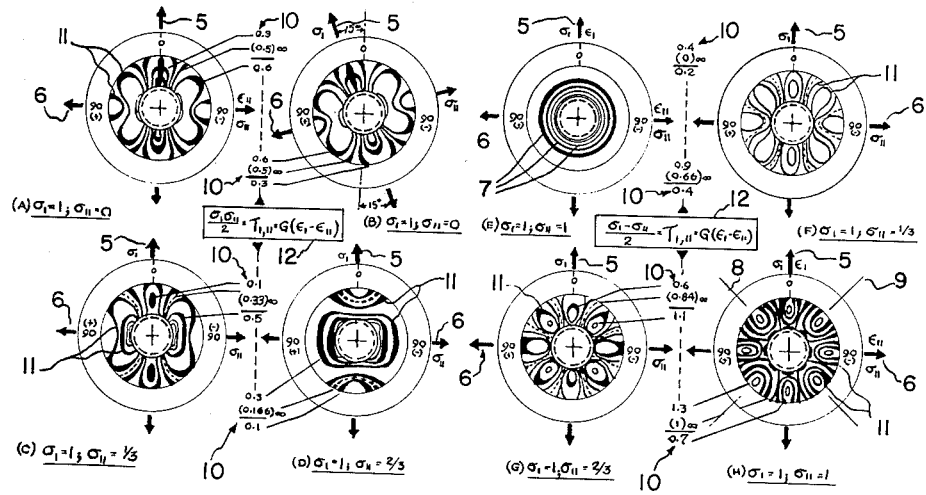
FIG. 3 is a series of patterns showing the theoretical shearing stress distribution for different stress ratios.
Figure 4:
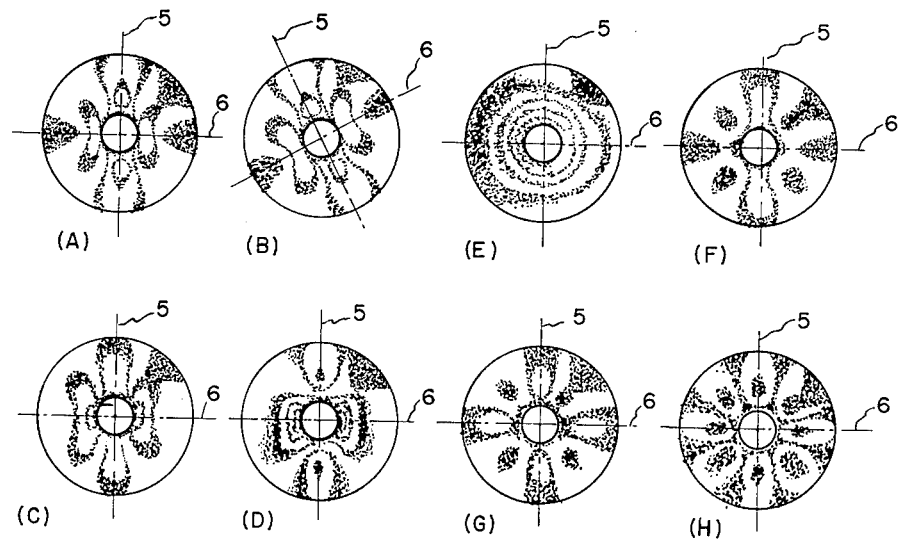
FIG. 4 is a series of patterns similar to those of FIG. 3 but showing actual fringe patterns as obtained from my photoelastic device for corresponding stress ratios.

FIG. 3(A) illustrates the shearing stress distribution as found by calculation at a circular hole in a plate which is subjected to uniaxial tension. The axes 5 and 6 of symmetry of the calculated shearing stress pattern at the hole can be seen to coincide with the directions of the principal tensile stresses $\sigma_\mathrm{I}$ and $\sigma_\mathrm{II}$ and of the principal strains $\epsilon_\mathrm{I}$ and $\epsilon_\mathrm{II}$ in the plate. In uniaxial tensile stress directed differently from that in FIG. 3(A) is applied to the plate, for example, inclined 15 degrees to the former direction as shown in FIG. 3(B), then the pattern at the hole has its axes of symmetry rotated correspondingly. Since in the case considered here the second principal stress was zero, the stress ratio $$\frac{\sigma_\mathrm{II}}{\sigma_\mathrm{I}}$$

may be designated as being zero. Other stress ratios, for example, $$\frac{\sigma_\mathrm{I}}{\sigma_\mathrm{II}}=\frac{1}{3}$$

in FIG. 3(C), or is equal to ⅔ in FIG. 3(D), or is equal to 1 in FIG. 3(E), or equal to —⅓ in FIG. 3(F), or equal to —⅔ in FIG. 3(G), or equal to —1 in FIG. 3(H), applied to the plate alter the calculated stress pattern at the hole, as shown in FIG. 3(C–H). These patterns state, furthermore, that the axes 5 and 6 of symmetry of the pattern always coincide with the directions of principal strains $\epsilon_\mathrm{I}$ and $\epsilon_\mathrm{II}$ and principal stress $\sigma_\mathrm{I}$ and $\sigma_\mathrm{II}$.

In case of equal biaxial tensile or compressive stress, however, there exists no preferred direction, since the shearing stresses in the plate remote from the hole are zero. The calculated pattern in this case consists of concentric circles 7, FIG. 3(E).

In the case of pure shear applied to the plate, the calculated shearing stress pattern at the hole makes it possible to draw two rectangular crosses of symmetry 8 and 9, and 5 and 6, 45 degrees to each other, FIG. 3(H). The other cross given by lines 5 and 6, cutting the shearing stress minima shown as 0.7 (maxima 1.3), coincides with the directions of the principal stresses $\sigma_\mathrm{I}$, $\sigma_\mathrm{II}$ and strains $\epsilon_\mathrm{I}$, $\epsilon_\mathrm{II}$ in the plate, FIG. 3(H). The values of shearing stresses $\tau_{I,II}$ in the other figures of group FIG. 3 for given values of $\sigma_I$ and $\sigma_{II}$ are shown in these figures, for example at 10. As is well known the shearing stress along any given line 11 is constant. The shearing stress $\tau_{I,II}$ might also be expressed by the product of the shear modulus G of the gage plate material and the difference of the principal strains acting in the specimen, this relation being indicated at 12, FIG. 3.

Two general rules derived from the calculations indicated above are stated:

(a) The rectangular cross of the principal stress and strain directions coincides with the axes of symmetry of the fringe pattern and cuts the mimina of the shearing stresses which exist in the surroundings of the hole.

(b) The disturbances caused by a circular hole in a plate become negligible outside an area having a diameter three or four times the diameter of the hole.

If, therefore, a gage designed as shown by FIG. 1 and having an outer diameter equal to four times the diameter of the circular hole is attached along its boundary to the surface of a structural part i.e. test specimen, then the gage will undergo at its boundary the same deformations as the structural part. The gage will react at its hole like a large plate with a hole. The gage will indicate strains and stresses acting in the region of the structural part to which the gage is bonded.

As is well known, the isochromatic fringe lines visible in the gage will correspond to lines of constant shearing stress. Fringe patterns shown in FIG. 4(A–H) were obtained from actual tests conducted with gages which were bonded to a plate and then subjected to various stress ratios. These show full similarity to the calculated patterns for corresponding stress ratios. The directions of the principal strains and stresses are, therefore, indicated by the axes 5 and 6 of symmetry of the fringe pattern displayed by the gage.

The principal strain directions, as was found by actual practical applications, are indicated by the symmetry lines of its pattern if the following ratios in dimensions are used: The ratio of the thickness of the circular gage plate to its outer diameter is equal or less than 1:10 and that the ratio of the diameter of the circular hole at the center of the circular gage plate to the diameter of this latter plate is equal or less than 1:3 and that furthermore the ratio of the diameter of the circular hole at the center of the circular gage plate to the diameter covered by the circular mirror or by the diameter of the rubber film covering this mirror is equal or less than 1:2.

From the foregoing disclosure it is seen that I have eliminated the need for optically inhomogeneous strain plate material and am therefore able to use relatively inexpensive cast material that need not be subjected to special treatments such as stress freezing.

Various changes in details of construction may be made by those skilled in the art without departing from the spirit of the following claims.

I claim:

1. Photoelastic device for indication of principal strain directions in the surface of a specimen to be strained comprising, in combination, a substantially circular gage plate of a strain-optical transparent birefringent material having a substantially circular hole whose axis is normal to the plane of the plate and substantially coaxial therewith, a mirrored surface facing the body of the gage plate and being located entirely within the periphery thereof so as to reflect light through the birefringent material, a thin substantially circular elastic member interposed between the mirror and specimen surface, and circular polarizing light means overlying the gage plate so that polarized light substantially normal to the plate will be reflected by the mirror back through the gage plate; the ratio of the thickness of the gage plate to its outer diameter being equal or less than substantially 1 to 10, and the ratio of the diameter of the circular hole to the diameter of the circular plate being equal or less than substantially 1 to 3, and the ratio of the diameter of the circular hole to the diameter of the circular elastic member being equal or less than substantially 1 to 2; and the gage plate bonded around its periphery to the specimen surface, whereby strains in the specimen surface are transmitted to the bonded gage plate so as to subject the plate to corresponding strains which produce symmetrical interference patterns whose axes of symmetry coincide with the two principal strain directions, the elastic member preventing the gage plate from being rigidly bonded to the specimen in the area covered by the elastic member so that the gage plate is free to deform in such area and thereby effect the originating of said patterns.

2. The combination set forth in claim 1 further characterized in that the circular elastic member covers the back of the mirror and is bonded to the gage plate.

3. The combination set forth in claim 1 further characterized in that the mirror is circular, the circular elastic member and mirror being concentric to the gage plate, and the elastic member being bonded to the gage plate.

4. The combination set forth in claim 1 further characterized in that the polarized light is obtained by the provision of a polarizing film bonded to the top surface of the gage member.

5. Photoelastic device for indication of principal strain directions in the surface of a specimen to be strained comprising, in combination, a substantially circular gage plate of a strain-optical transparent birefringent material having a substantially circular hole whose axis is normal to the plane of the plate and substantially coaxial therewith, a mirrored surface facing the body of the gage plate and being located entirely within the periphery thereof so as to reflect light through the birefringent material, an elastic member interposed between the mirror and the test surface to allow free deformation of the gage plate so as to obtain unrestricted stress distribution in the plate around the hole, and circular light polarizing means overlying the gage plate so that polarized light substantially normal to the plate will be reflected by the mirror back through the gage plate; and the gage plate being bonded around its periphery to the specimen surface, whereby strains in the specimen surface are transmitted to the bonded gage plate so as to subject the plate to corresponding strains which produce symmetrical interference patterns whose axes of symmetry coincide with the two principal strain directions.

References Cited in the file of this patent

UNITED STATES PATENTS

| | | |
|---|---|---|
| 2,014,688 | Mabboux | Sept. 17, 1935 |
| 2,625,850 | Stanton | Jan. 20, 1953 |
| 3,034,341 | Golubovic | May 15, 1962 |